(12) United States Patent
McEllen et al.

(10) Patent No.: US 6,286,981 B1
(45) Date of Patent: Sep. 11, 2001

(54) SADDLE AND HARP SHADE FOR SEPARATELY BALLASTED NON-INCANDESCENT LAMPS

(75) Inventors: John J. McEllen, Chagrin Falls; Dan V. Adams, N. Ridgeville; Bruce W. Maryanski, Brecksville, all of OH (US)

(73) Assignee: Luxel Technologies, Ltd., Cleveland, OH (US)

( * ) Notice: Subject to any disclaimer, the term of this patent is extended or adjusted under 35 U.S.C. 154(b) by 0 days.

(21) Appl. No.: 09/388,070

(22) Filed: Sep. 1, 1999

(51) Int. Cl.[7] .............................. F21V 17/00; F21V 23/02
(52) U.S. Cl. ............................................. 362/417; 362/411
(58) Field of Search .................................. 362/353, 351, 362/410, 411, 414, 417, 452

(56) References Cited

U.S. PATENT DOCUMENTS

| | | | | |
|---|---|---|---|---|
| 4,096,556 | * | 6/1978 | Berger et al. | 362/417 |
| 4,241,386 | * | 12/1980 | Dooley | 362/417 |
| 4,638,413 | * | 1/1987 | Tarlow | 362/414 |
| 4,851,981 | * | 7/1989 | Ruesch | 362/452 |
| 5,412,554 | * | 5/1995 | Lee | 362/417 |
| 5,424,610 | * | 6/1995 | Pelton et al. | 362/411 |
| 5,825,637 | * | 10/1998 | Chen | 362/417 |

* cited by examiner

Primary Examiner—Alan Cariaso
(74) Attorney, Agent, or Firm—Renner, Kenner, Greive, Bobak, Taylor & Weber

(57) ABSTRACT

A shade holder is provided for use with table and floor lamps having separately ballasted non-incandescent lamps. The shade holder includes the combination of a saddle and harp, the saddle having a central base element with spacer members extending angularly from opposite ends thereof. The harp is generally elliptical or oval in shape and is received by the saddle at ends of the angularly extending spacer members. The resultant shade holder provides for receipt of a disk-like or cylindrical ballast adjacent the saddle, with the ballast receiving an appropriate non-incandescent lamp, such as a high intensity discharge, inductive or compact fluorescent lamp. The saddle and harp are configured with appropriate angles and bends to accomodate both the ballast and the lamps while providing an aesthetically pleasing appearance.

4 Claims, 2 Drawing Sheets

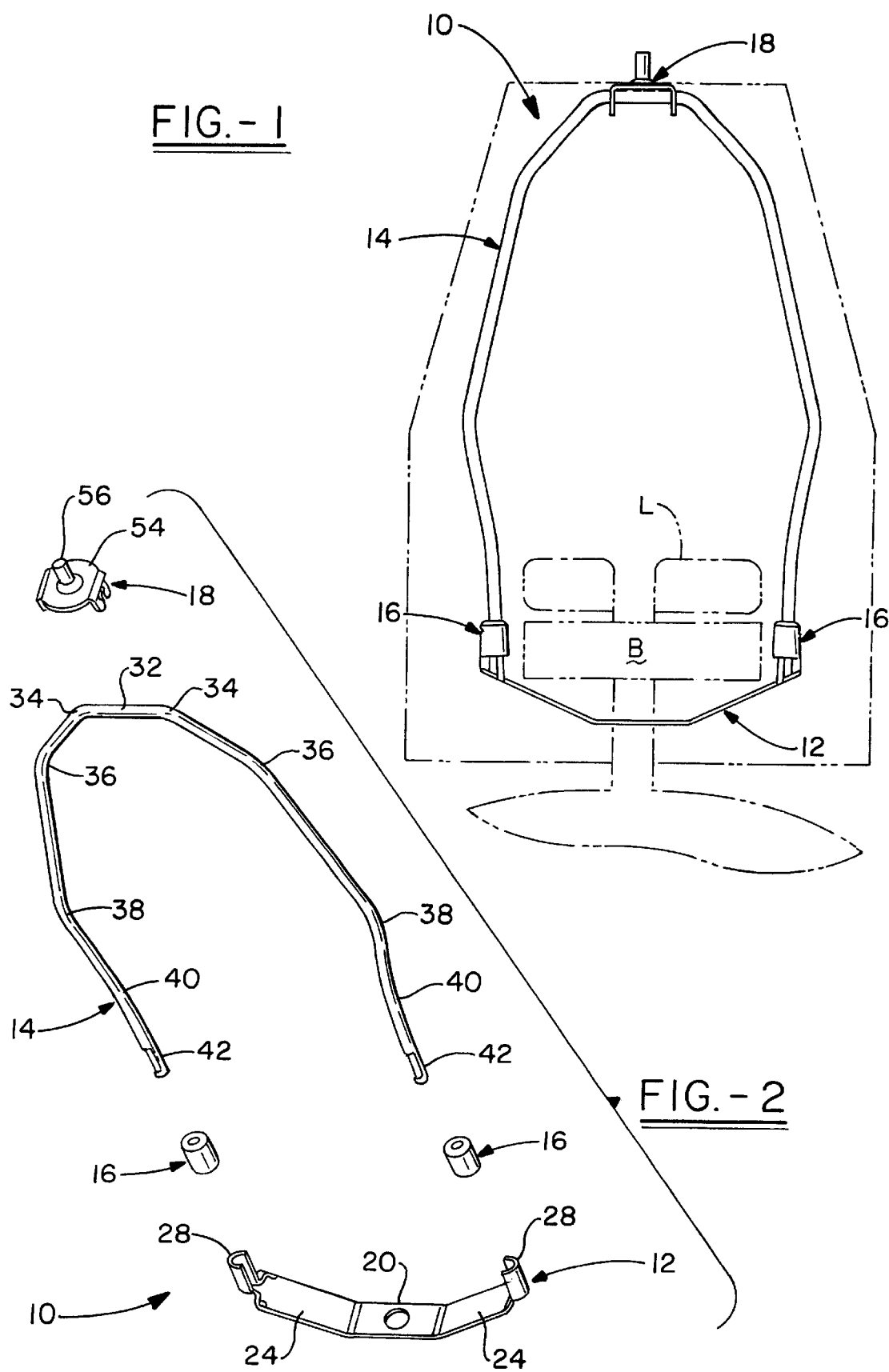

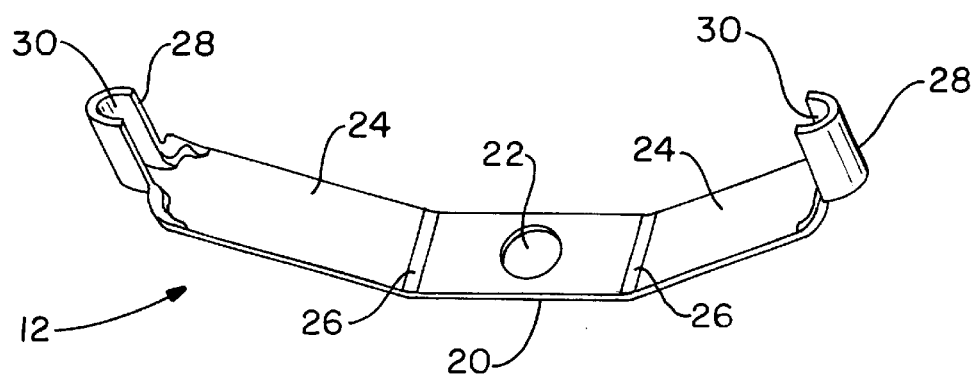
FIG.-3
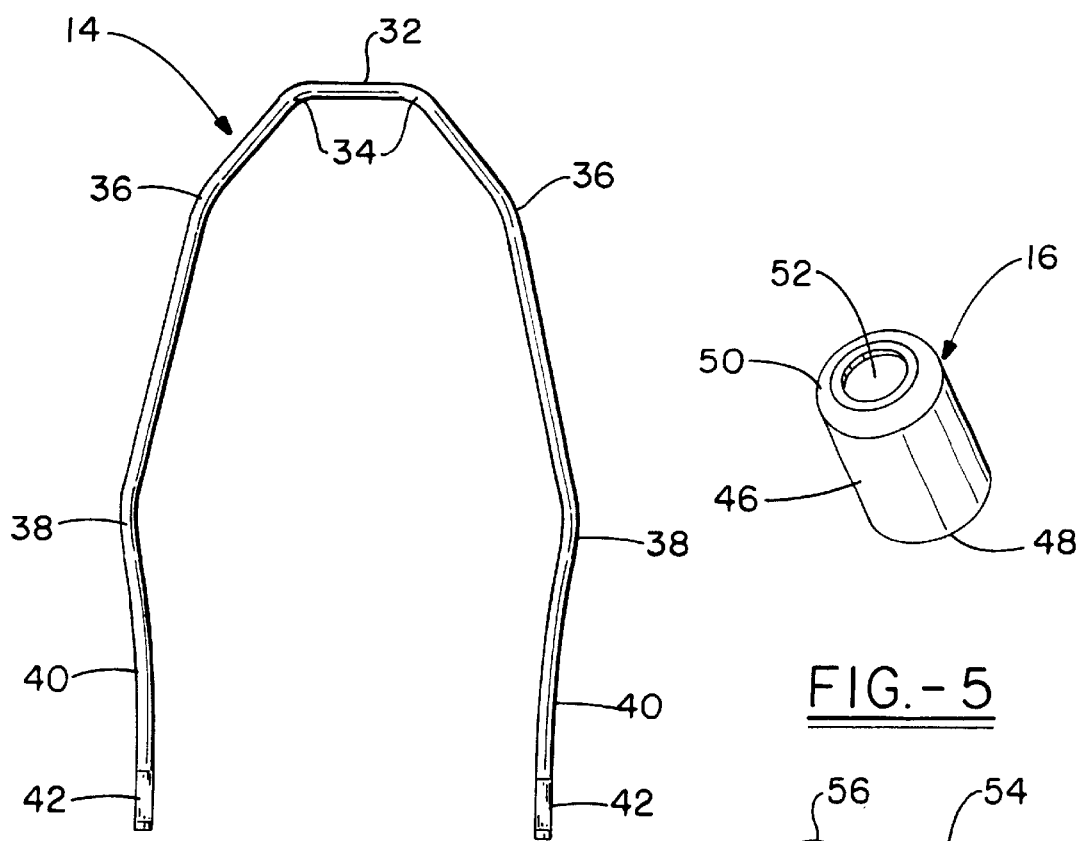
FIG.-4
FIG.-5
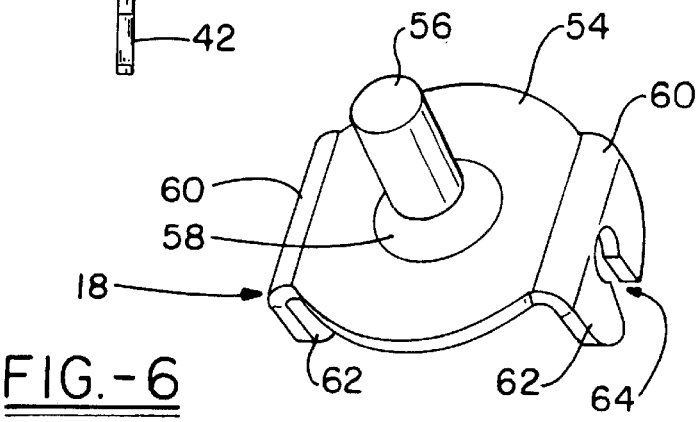
FIG.-6

SADDLE AND HARP SHADE FOR SEPARATELY BALLASTED NON-INCANDESCENT LAMPS

TECHNICAL FIELD

The present invention resides generally in the art of lighting fixtures and, more particularly, in the art of lamp shade holders. More specifically, the present invention is directed towards a shade holder for non-incandescent ballasted lamps, such as fluorescent lamps.

BACKGROUND ART

It is well known that high intensity discharge light sources and fluorescent light sources are desirable over incandescent light sources in many lighting applications for a variety of reasons. As compared to incandescent light sources, these light sources tend to provide superior optical control characteristics, power efficiency and longevity, and these factors, in turn, make such light sources desirable for reasons of economics. Indeed, increased use of these light sources for residential lighting can help reduce the relative amount of power required to properly light homes and apartments. The same economics can be realized in the commercial arena when used in hotels and the like. In light of this knowledge, it is desirable to provide a shade holder for such light sources. In addition, it is desirable to provide a shade holder that can be used to convert the common residential lamp using incandescent bulbs into a lamp capable of utilizing separately ballasted high intensity discharge, compact fluorescent and other non-incandescent bulbs. Moreover, it is desirable to hard wire these ballasts in the lamp so that replacing burned out fluorescent bulbs or high intensity discharge bulbs does not require replacement of the ballast.

DISCLOSURE OF INVENTION

In light of the foregoing, it is a first aspect of the present invention to provide a shade holder to be used in conjunction with separately ballasted high intensity discharge, compact fluorescent and other non-incandescent bulbs.

Another aspect of the present invention is to provide a shade holder having a saddle and harp design so as to be easily mountable onto a common table or floor lamp.

Still a further aspect of the present invention is to provide a shade holder, as above, providing the requisite mounting space needed for the ballasts associated with high intensity discharge, compact fluorescent and other non-incandescent bulbs.

Yet another aspect of the present invention is to provide a shade holder, as above, allowing for the easy installment and/or replacement of the ballasts and bulbs associated herewith.

The foregoing and other aspects of the invention which will become apparent as the detailed description proceed are achieved by a shade holder for ballasted lamps, comprising: a saddle having a base with spacer members extending from opposite ends thereof; and a harp received by said saddle, said harp being generally oval in shape.

Other aspects of the invention that will become apparent herein are achieved by a lamp assembly, comprising: a saddle; a ballast nestingly received by said saddle; a lamp received by said ballast; and a harp received by said saddle, said harp forming a loop over said ballast and lamp.

BRIEF DESCRIPTION OF THE DRAWINGS

For a complete understanding of the objects, techniques and structure of the invention, reference should be made to the following detailed description and accompanying drawings wherein:

FIG. 1 is a front view of the shade holder of the present invention shown mounted onto a common residential lamp having a ballast and non-incandescent light bulbs installed thereon, the lamp and other elements not forming the shade holder of the present invention being shown in phantom;

FIG. 2 is an assembly diagram of the shade holder of the present invention;

FIG. 3 is a perspective view of the saddle element of the shade holder of the present invention;

FIG. 4 is a front view of the harp element of the shade holder of the present invention;

FIG. 5 is a perspective view of the sleeve element of the shade holder of the present invention; and FIG. 6 is a perspective view of the shade mounting piece element of the shade holder of the present invention.

BEST MODE FOR CARRYING OUT THE INVENTION

Referring now to FIGS. 1 and 2, it can be seen that the shade holder of the present invention is designated generally by the numeral 10. Shade holder 10 has a saddle 12 that retains a harp 14 by means of sleeves 16. A shade mounting piece 18 is affixed to harp 14 so that a shade S may be mounted over shade holder 10.

With additional reference to FIG. 3, it can be seen that saddle 12 provides a base 20 having an aperture 22 therein. Aperture 22 allows saddle 12 to be mounted onto a common table or floor lamp. As can be clearly seen in FIG. 1, aperture 22 also provides the means by which a ballast B, having non-incandescent light bulbs L attached thereto, may communicate with the lamp. As shown, the ballast B is typically disk-shaped, and often annular in nature, the same being well known in the art. In order to provide sufficient room for mounting ballast B on the lamp, saddle 12 provides spacer members 24 extending upwardly and outwardly from opposite ends of the base 20 through the provision of bends 26. At the distal ends of spacer members 24, tapered ends 28 are formed. Tapered ends 28 provide harp receiving channels 30 which, as will be discussed hereinbelow, receive the ends of harp 14 so that harp 14 may be releasably attached to saddle 12 by sleeves 16.

With reference to FIG. 4, it can be seen that harp 14 is of single-piece construction and provides a flat top portion 32 upon which shade mounting piece 18 is secured. Bends 34 in harp 14 define flat top portion 32 and help to define the shape of harp 14 as it extends from top flat portion 32 towards its attachment with saddle 12. The remainder of harp 14 is defined by bends 36, 38 and 40. As can be seen in the accompanying drawings, harp 14 extends outwardly from top flat portion 32 at bends 34 and continues extending outwardly, although to a lesser degree, at bends 36. From bends 38, however, harp 14 extends slightly inwardly such that the upper portion of harp 14 is somewhat oval in shape. At bends 40, harp 14 extends downwardly in a direction substantially perpendicular to flat top portion 32. The ends 42 of harp 14 can therefore intimately mate with harp receiving channels 30 that extend substantially perpendicularly to base member 20 of saddle 12. Additionally, ends 42 provide contoured portion 44 to increase the intimacy of the fit between ends 42 and harp receiving channels 30.

Harp 14 is fit onto saddle 12 simply by compressing ends 42 in towards one another and orienting ends 42 in registration with harp receiving channels 30 such that, when the ends 42 are released, harp 14 reverts back to its regular shape such that ends 42, and more particularly contoured portions 44, are urged into harp receiving channels 30. Sleeves 16, slidably engaging harp 14, are then slipped down over harp receiving channels 30 so as to selectively prevent the removal of harp 14 from its connection with saddle 12.

Referring now to FIG. 5, it can be seen that sleeve 16 is a cylindrical member 46 having an open end 48 at one end thereof and a tapered end 50 having an aperture 52 at the other end thereof. Aperture 52, in tapered end 50, is shaped to be slightly larger than the thickness of harp 14 such that sleeve 16 may be placed on harp 14 and allowed to slide to various positions along harp 14. It should be noted, however, that contour portions 44 on ends 42 of harp 14 prevent sleeves 16 from being removed from harp 16. This is so because the dimensions of harp 16 at contoured portions 44 are slightly larger than aperture 52 in sleeve 16. As mentioned above, sleeves 16 slide over ends 42 of harp 14 when ends 42 are placed in harp receiving channels 30 of saddle 12. Sleeves 16 are moved away from ends 42 so that the ends 42 can be placed in the harp receiving channels 30 and are thereafter moved to surround the ends 42 and harp receiving channels 30 so that harp 14 cannot be removed from saddle 12.

With particular reference to FIG. 6, it can be seen that shade mounting piece 18 provides a base member 54 through which extends a bolt 56. In the area adjacent bolt 56 on base member 54 is provided a raised portion 58 which, as those skilled in the art will readily appreciate, facilitates the placement of a lamp shade of shade mounting piece 18. Ends 60 in base member 54 provide flanges 62 extending perpendicularly downward from base portion 54. Flanges 62 provide mounting guides 64 that allow shade mounting piece 18 to be fit onto flat top portion 32 of harp 14.

In FIG. 1, it can be seen how the saddle 12, harp 14, sleeve 16 and shade mounting piece 18 communicate to provide a shade holder 10 for separately ballasted non-incandescent lamps. The dimensions of saddle 12 provide sufficient room for the attachment of a ballast B to the lamp as well as for the attachment of non-incandescent light bulbs L to the ballast B. Of course, it will be understood that the configuration of the ballast B. Of course, it will be understood that the configuration of the ballast B may be such as to accomodate but a single lamp L, as desired.

It will be appreciated that an aspect of the invention is the provision of a lamp shade holder that is not only functional to accomodate non-incandescent light bulbs L and their associated ballast B, but to be aesthetically pleasing, as well. In that regard, it has been found that the saddle 12 preferably has an overall width of 4.5–5.0 inch between the tapered ends 28, and most preferably on the order of 4.75 inch. In the preferred embodiment, the base 20 of the saddle 12 has a width of 1.25–1.75 inch, and most preferably approximately 1.5 inch. Each of the spacer members 24 departs from the base 20 at an angle on the order of 20°–300, and most preferably 25°. In the preferred embodiment, the harp 14 has a height of 8–10 inch and, most preferably, 9.125 inch. Such a harp also has a maximum width at the bends 38 of 5.0–6.5 inch and, most preferably, 5.75 inch. Moreover, the bends 38 are positioned 3.6–4.2 inch from the open end of the harp 14, and most preferably 9.1 inch. In the preferred configuration, a shade holder 10 made in accordance with the invention will be aesthetically pleasing with an overall height from the base 20 to the top of the shade mounting piece 18 on the order 9–13 inch, and most preferably 10.5 inch. Such a shade holder accommodates the ballast B and lamps L in a compact and cost efficient manner, while receiving and maintaining a lamp shade.

Thus it can be seen that the objects of the invention have been satisfied by the structure presented hereinabove. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. A shade holder for ballasted lamps, comprising:

a saddle having a base with spacer members extending from opposite ends thereof;

a harp received by said saddle, said harp being generally oval in shape; and wherein each said spacer member forms an angle of 20°–30° with said base, said saddle has an overall width of 4.5–5.0 inches and said base has a width of 1.251–1.75 inches, and said harp has a height of 8–10 inches.

2. The shade holder for ballasted lamps according to claim 1, wherein said harp has a maximum width of 5.0–6.5 inches.

3. The shade holder for ballasted lamps according to claim 2, wherein said harp has an open end and a closed end, and said maximum width of said harp is at 3.6–4.2 inch from said open end.

4. A lamp assembly, comprising:

a saddle;

a ballast nestingly received by said saddle;

a lamp received by said ballast;

a harp received by said saddle, said harp forming a loop over said ballast and lamp; and wherein said saddle comprises a base having spacer members extending angularly from opposite ends thereof, said spacer members receiving said harp, said harp extending outwardly from said spacer members, said loop having a maximum width of 5.0–6.5 inches and said harp having a height of 8–10 inches.

* * * * *